(12) United States Patent
Akah et al.

(10) Patent No.: US 11,857,955 B1
(45) Date of Patent: Jan. 2, 2024

(54) PROCESSES OF PRODUCING CATALYSTS

(71) Applicant: Saudi Arabian Oil Company, Dhahran (SA)

(72) Inventors: Aaron Chi Akah, Dharahn (SA); Veera Venkata Ramakrishna Tammana, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/964,156

(22) Filed: Oct. 12, 2022

(51) Int. Cl.
| | |
|---|---|
| *B01J 29/70* | (2006.01) |
| *B01J 37/02* | (2006.01) |
| *B01J 35/10* | (2006.01) |
| *B01J 23/745* | (2006.01) |
| *B01J 27/14* | (2006.01) |
| *B01J 21/04* | (2006.01) |
| *B01J 37/00* | (2006.01) |
| *C10G 11/05* | (2006.01) |
| *B01J 35/00* | (2006.01) |
| *B01J 35/02* | (2006.01) |
| *B01J 23/10* | (2006.01) |
| *B01J 29/04* | (2006.01) |
| *B01J 29/76* | (2006.01) |
| *B01J 37/10* | (2006.01) |
| *B01J 37/28* | (2006.01) |

(52) U.S. Cl.
CPC ........... *B01J 37/0205* (2013.01); *B01J 21/04* (2013.01); *B01J 23/10* (2013.01); *B01J 23/745* (2013.01); *B01J 27/14* (2013.01); *B01J 29/041* (2013.01); *B01J 29/042* (2013.01); *B01J 29/044* (2013.01); *B01J 29/7007* (2013.01); *B01J 29/7057* (2013.01); *B01J 29/7615* (2013.01); *B01J 35/006* (2013.01); *B01J 35/023* (2013.01); *B01J 35/1019* (2013.01); *B01J 35/1023* (2013.01); *B01J 35/1042* (2013.01); *B01J 35/1057* (2013.01); *B01J 35/1061* (2013.01); *B01J 37/0018* (2013.01); *B01J 37/0072* (2013.01); *B01J 37/10* (2013.01); *B01J 37/28* (2013.01); *C10G 11/05* (2013.01); *B01J 2229/18* (2013.01); *B01J 2229/186* (2013.01); *B01J 2229/22* (2013.01); *B01J 2229/38* (2013.01); *B01J 2229/40* (2013.01); *B01J 2229/42* (2013.01)

(58) Field of Classification Search
CPC ... B01J 21/04; B01J 27/14; B01J 23/10; B01J 23/745; B01J 29/041; B01J 29/042; B01J 29/044; B01J 29/7007; B01J 29/7057; B01J 29/7615; B01J 2229/38; B01J 2229/18; B01J 2229/186; B01J 2229/22; B01J 2229/42; B01J 2229/40; B01J 37/10; B01J 37/28; B01J 37/0072; B01J 37/0018; B01J 37/0205; B01J 35/023; B01J 35/1019; B01J 35/1023; B01J 35/1042; B01J 35/1057; B01J 35/1061; B01J 35/109; C10G 11/05
USPC ............. 502/60, 63, 64, 65, 66, 68, 69
See application file for complete search history.

(56) References Cited

U.S. PATENT DOCUMENTS

| | | |
|---|---|---|
| 10,391,480 B2 | 8/2019 | Zhang et al. |
| 2021/0001317 A1* | 1/2021 | Sun ..................... C10G 35/095 |
| 2022/0001362 A1 | 1/2022 | Koseoglu et al. |
| 2022/0032275 A1 | 2/2022 | Zhang |

* cited by examiner

*Primary Examiner* — Elizabeth D Wood
(74) *Attorney, Agent, or Firm* — DINSMORE & SHOHL LLP

(57) ABSTRACT

A process of producing a catalyst comprises forming mesoporous beta zeolite particles, impregnating mesoporous beta zeolite particles with a metal and phosphorus to produce a metal and phosphorus impregnated zeolite, and incorporating the metal and phosphorus impregnated zeolite with clay and alumina to produce the catalyst. The forming step comprises converting a crystalline beta zeolite to a non-crystalline material with reduced silica content relative to the crystalline beta zeolite, and crystalizing the non-crystalline material to produce mesoporous beta zeolite particles.

17 Claims, 3 Drawing Sheets

US 11,857,955 B1

PROCESSES OF PRODUCING CATALYSTS

BACKGROUND

Field

The present disclosure generally relates to catalysts and, more particularly, to processes for producing catalysts.

Technical Background

Ethylene, propene, butene, butadiene, and aromatics compounds such as benzene, toluene and xylenes are basic intermediates for a large proportion of the petrochemical industry. They are usually obtained through the thermal cracking (or steam pyrolysis) of petroleum gases and distillates such as naphtha, kerosene or even gas oil. These compounds are also produced through refinery fluidized catalytic cracking (FCC) process where classical heavy feedstocks, such as gas oils or residues, are converted. Typical FCC feedstocks range from hydrocracked bottoms to heavy feed fractions such as vacuum gas oil and atmospheric residue; however, these feedstocks are limited. The second most important source for propene production is currently refinery propene from FCC units. With the ever-growing demand, FCC unit owners look increasingly to the petrochemicals market to boost their revenues by taking advantage of economic opportunities that arise in the propene market.

The worldwide increasing demand for light olefins remains a major challenge for many integrated refineries. In particular, the production of some valuable light olefins such as ethylene, propene, and butene has attracted increased attention as pure olefin streams are considered the building blocks for polymer synthesis. The production of light olefins depends on several process variables like the feed type, operating conditions, and the type of catalyst.

Despite the options available for producing a greater yield of propene and other light olefins, intense research activity in this field is still being conducted. These options include developing more selective catalysts for the process, and enhancing the configuration of the process in favor of more advantageous reaction conditions and yields. In particular, due to their excellent stability, strong acidity, and regular pore sizes, zeolites are of great importance to industrial catalysis in petrochemical and chemical conversion processes.

SUMMARY

Accordingly, ongoing needs exist for processes of producing catalysts that are suitable for chemical processing. Embodiments of the present disclosure meet this need by producing catalysts, as described herein. The presently described processes produce the catalyst by forming mesoporous beta zeolite particles, impregnating mesoporous beta zeolite particles with a metal and phosphorus to produce a metal and phosphorus impregnated zeolite, and incorporating the metal and phosphorus impregnated zeolite with clay and alumina to produce the catalyst. In some embodiments, the catalysts produced by the presently described processes may have micropores, mesopores, and macropores; and the mesopores and micropores may be more uniform as compared to conventional catalysts. Such catalysts, prepared by the processes disclosed herein, may be particularly useful in steam enhanced catalytic cracking systems and capable of direct conversion of crude oil into light olefins with increased yield of light olefins, such as at least one of ethylene and propylene. The catalysts prepared by the process disclosed herein may withstand high hydrothermal conditions, while retaining its activity and selectivity.

According to one or more embodiments of the present disclosure, a process of producing a fluidized catalytic cracking catalyst comprises forming mesoporous beta zeolite particles, impregnating mesoporous beta zeolite particles with a metal and phosphorus to produce a metal and phosphorus impregnated zeolite, and incorporating the metal and phosphorus impregnated zeolite with clay and alumina to produce the catalyst. The forming step comprises converting a crystalline beta zeolite to a non-crystalline material with reduced silica content relative to the crystalline beta zeolite, and crystalizing the non-crystalline material to produce mesoporous beta zeolite particles.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 2:
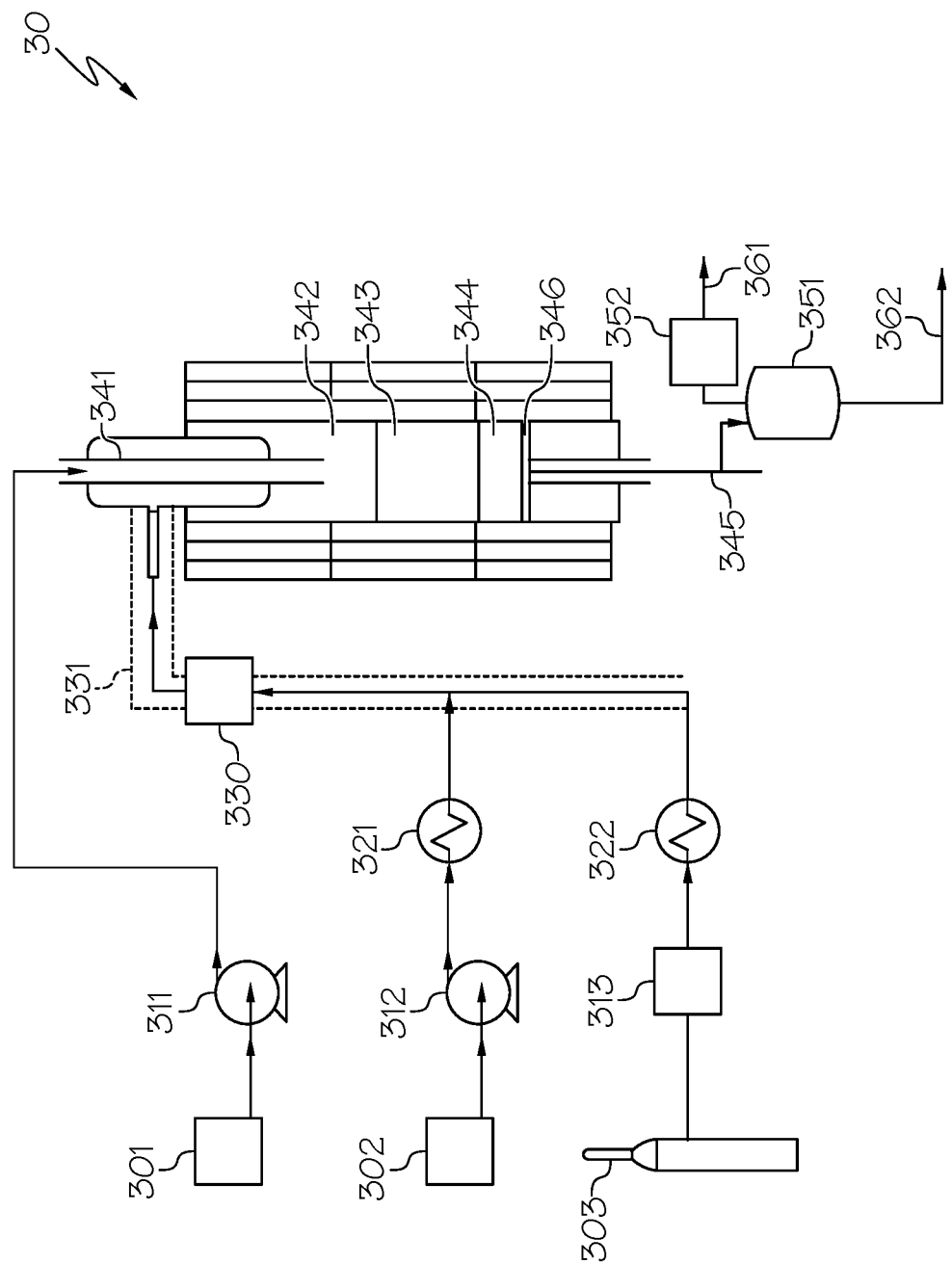
FIG. 2 is a generalized schematic diagram of a fixed-bed reaction system, according to one or more embodiments described in this disclosure.

For the purpose of describing the simplified schematic illustration and description of FIG. 2, the numerous valves, temperature sensors, electronic controllers, and the like that may be employed and well known to those of ordinary skill in the art of certain chemical processing operations are not included. Further, accompanying components that are often included in chemical processing operations, such as, for example, air supplies, heat exchangers, surge tanks, catalyst hoppers, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

Figure 3:
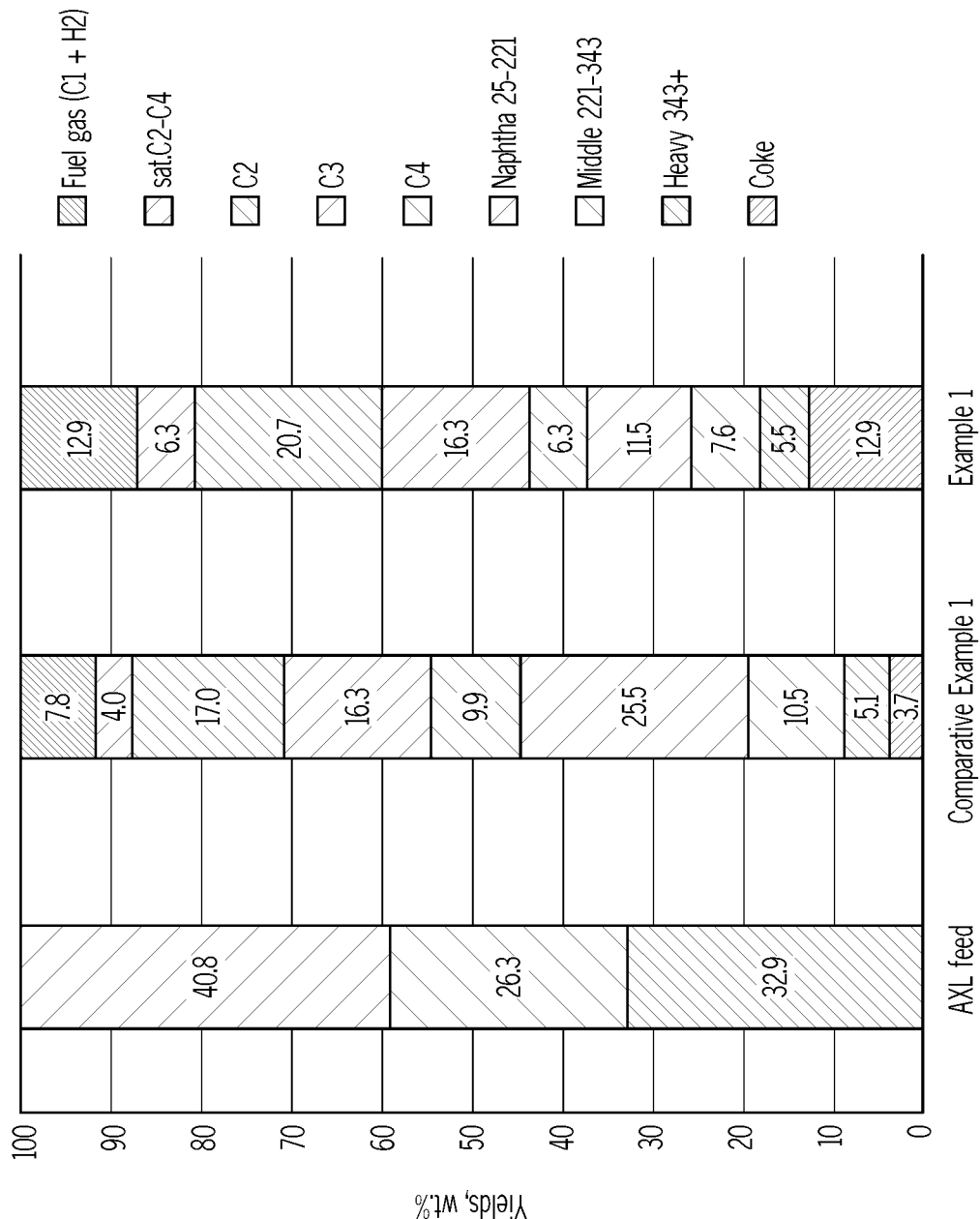
FIG. 3 depicts yield analyses for Example 2.

It should be understood that two or more process streams are "mixed" or "combined" when two or more lines intersect in the schematic flow diagram of FIG. 3. Mixing or combining may also include mixing by directly introducing both streams into a like reactor, separation device, or other system component. For example, it should be understood that when two streams are depicted as being combined directly prior to entering a separator or reactor, that in some embodiments the streams could equivalently be introduced into the separator or reactor and be mixed in the reactor.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Disclosed herein are processes for forming catalysts that, in some embodiments, may be useful in steam enhanced fluid catalytic cracking reactions of hydrocarbons. The processes may generally include forming mesoporous beta zeolites, impregnating the mesoporous beta zeolite particles, and incorporation with clay and alumina. Particular non-limiting embodiments of such processes are disclosed herein.

As used in this disclosure, the term "catalyst" may refer to any substance that increases the rate of a specific chemical reaction.

As used in this disclosure, the term "cracking" may refer to a chemical reaction where a molecule having carbon-carbon bonds is broken into more than one molecule by the breaking of one or more of the carbon-carbon bonds; where a compound including a cyclic moiety, such as an aromatic, is converted to a compound that does not include a cyclic moiety; or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality.

As used in this disclosure, the term "particle size" of crystalline beta zeolite or mesoporous beta zeolite may refer to a greatest distance between two points located on crystalline beta zeolite or mesoporous beta zeolite. For example, the particle size of a spherical particle would be its diameter. In other shapes, the particle size is measured as the distance between the two most distant points of the same particle, where these points may lie on outer surfaces of the particle. The particle size may be determined by scanning electron microscopy (SEM).

As used in this disclosure, the term "crystal size" of crystalline beta zeolite or mesoporous beta zeolite may refer to be a length of the coherent scattering domain in a direction orthogonal to the set of lattice planes which give rise to the reflection. The crystal size may be calculated from XRD.

As used in this disclosure, the term "pore size" of crystalline beta zeolite or mesoporous beta zeolite may refer to the pore size determined by Barrett-Joyner-Halenda (BJH) analysis. BJH analysis measures the amount of a gas (argon) that detaches from a material, such as the mesoporous beta zeolite, at 87 Kelvin over a range of pressures. Using the Kelvin equation, the amount of argon adsorbate removed from the pores of the material and the relative pressure of the system can be used to calculate the pore size of the material.

As used in this disclosure, the term "microporous" may refer to a material, such as a beta zeolite, having pores with an average pore size of from 0.1 nanometers (nm) to 2 nm.

As used in the present disclosure, the term "mesoporous" may refer to a material, such as a beta zeolite, having pores with an average pore size of from 2 nm to 50 nm.

As used in this disclosure, the term "macroporous" may refer to a material, such as a catalyst, having pores with an average pore size of greater than 50 nm.

As used in the present disclosure, the term "crude oil" may refer to a mixture of petroleum liquids and gases, including impurities, such as sulfur-containing compounds, nitrogen-containing compounds, and metal compounds, extracted directly from a subterranean formation or received from a desalting unit without having any fractions, such as naphtha, separated by distillation.

As used in the present disclosure, the term "reactor" may refer to a vessel or series of vessels in which one or more chemical reactions may occur between one or more reactants in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors.

Figure 1A:
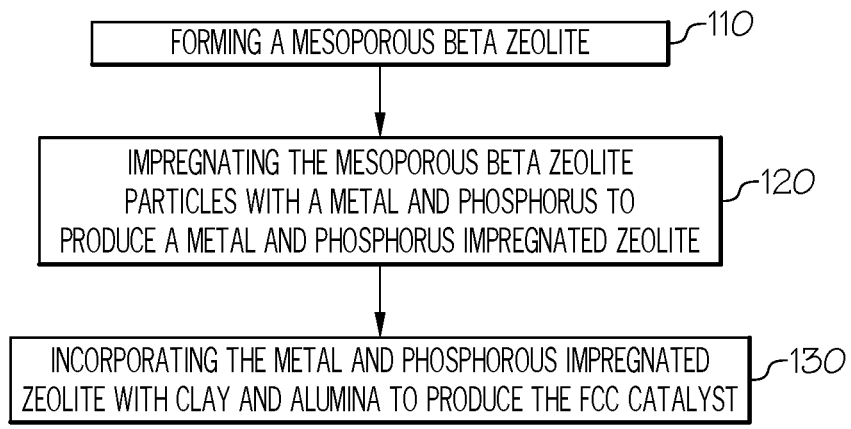
FIG. 1A depicts a flowchart for a process of producing a catalyst, according to one or more embodiments shown and described in this disclosure.
Figure 1B:
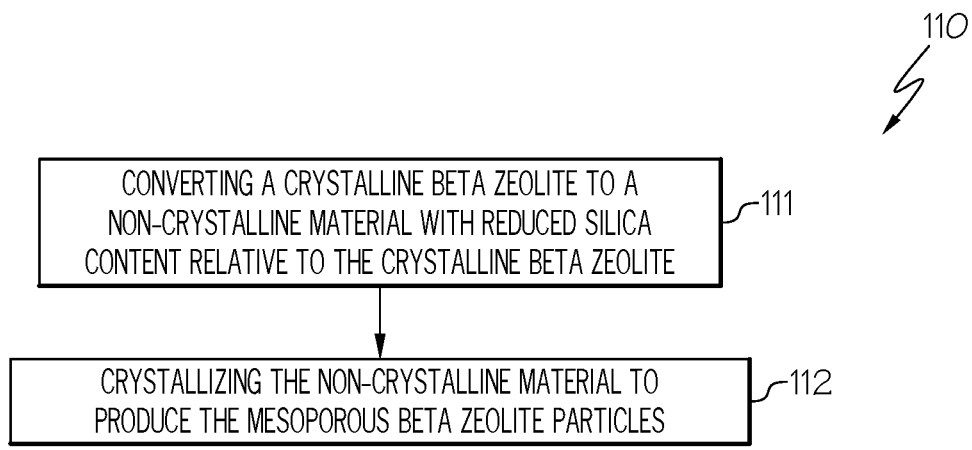
FIG. 1B depicts a flowchart for a process of forming a mesoporous beta zeolite, according to one or more embodiments shown and described in this disclosure.

Embodiments of the present disclosure are directed to processes of producing a catalyst. FIG. 1A depicts a flowchart for a process of producing a catalyst, according to one or more embodiments shown and described in this disclosure. FIG. 1B depicts a flowchart for a process of forming a mesoporous beta zeolite, according to one or more embodiments shown and described in this disclosure.

Referring to FIGS. 1A and 1B, in step 110, mesoporous beta zeolite particles are formed. Step 110 includes converting a crystalline beta zeolite to a non-crystalline material with reduced silica content relative to the crystalline beta zeolite. In one or more embodiments, step 110 includes steps 111 and 112 (of FIG. 1B).

In step 111, a crystalline beta zeolite is converted to a non-crystalline material. The crystalline beta zeolite may have an average crystal size of from 0.01 micrometers (μm) to 5.0 μm, from 0.01 μm to 3.0 μm, from 0.01 μm to 2.0 μm, from 0.01 μm to 1.5 μm, or from 0.01 μm to 1.4 μm. The particle size may be calculated from XRD. The particle of crystalline beta zeolite may comprise one or more crystals. The crystal may comprise one or more unit cells.

The crystalline beta zeolite may have an average crystal size of 0.05 μm to 5.0 μm, from 0.05 μm to 3.0 μm, from 0.05 μm to 2.0 μm, from 0.05 μm to 1.5 μm, from 0.05 μm to 1.4 μm, 0.1 μm to 5.0 μm, from 0.1 μm to 3.0 μm, from 0.1 μm to 2.0 μm, from 0.1 μm to 1.5 μm, or from 0.1 μm to 1.4 μm. The crystal size may be calculated from XRD.

The crystalline beta zeolite may have an average pore size of from 0.5 nanometers (nm) to 3.0 nm, from 0.5 nm to 2.0 nm, from 0.5 nm to 1.0 nm, from 0.5 nm to 0.75 nm, from 0.5 nm to 0.74 nm, from 0.56 nm to 3.0 nm, from 0.56 nm to 2.0 nm, from 0.56 nm to 1.0 nm, from 0.56 nm to 0.75 nm, or from 0.56 nm to 0.74 nm. The pore size may be determined using the Mercury Intrusion Porosimetry.

The crystalline beta zeolite may have a molar ratio of silica ($SiO_2$) to alumina ($Al_2O_3$) of greater than or equal to 10, greater than or equal to 20, or even greater than or equal to 30. The crystalline beta zeolite may have a molar ratio of $SiO_2$ to $Al_2O_3$ of less than or equal to 400, such as less than or equal to 350, or even less than or equal to 300. The crystalline beta zeolite may have a molar ratio of $SiO_2$ to $Al_2O_3$ of from 10 to 400, from 10 to 350, from 10 to 300, from 20 to 400, from 20 to 350, from 20 to 300, from 30 to 400, from 30 to 350, from 30 to 300, from 10 to 70, from 20 to 60, from 30 to 50, from 250 to 400, from 280 to 350, or from 300 to 320.

In step 111, the crystalline beta zeolite may be mixed with one or more solvents, cetyltrimethylammonium bromide (CTAB), and metal hydroxide to produce a solution. In some embodiments, the mixing step include mixing the crystalline beta zeolite with metal hydroxide, and then adding CTAB into a mixture of the crystalline beta zeolite with metal hydroxide. Without being limited by any particular theory, it is believed the mixing step may evenly disperse the crystalline beta zeolite, CTAB, and metal hydroxide. Mixing may include one or more of stirring, swirling, vortexing, shaking, sonicating, homogenizing, blending, or the like.

The metal hydroxide may include a single metal hydroxide species, or a combination of two or more metal hydroxide chemical species. In embodiments, the metal hydroxide comprises at least one alkali metal hydroxide, at least one alkali earth metal hydroxide, or combinations thereof. The metal hydroxide may comprise lithium hydroxide (LiOH), sodium hydroxide (NaOH), potassium hydroxide (KOH), rubidium hydroxide (RbOH), magnesium hydroxide ($Mg(OH)_2$), calcium hydroxide ($Ca(OH)_2$), strontium hydroxide ($Sr(OH)_2$), barium hydroxide ($Ba(OH)_2$), or combinations thereof.

In one or more embodiments, the metal hydroxide may be in a solution. The metal hydroxide solution may have a metal hydroxide concentration from 0.01 moles per liter (M) to 10 M, such as from 0.01 M to 5 M, from 0.01 M to 3 M, from 0.01 M to 1 M, from 0.05 M to 1 M, from 0.05 M to 0.8 M, from 0.05 M to 0.5 M, or from 0.1 M to 0.4 M.

Still referring to FIGS. 1A and 1B, as described above, the crystalline beta zeolite and the metal hydroxide may be mixed with cetyltrimethylammonium bromide (CTAB) in step 111. CTAB is a surfactant. In particular, when the solution including the crystalline beta zeolite, the metal hydroxide, and CTAB, the CTAB is heated to produce a non-crystalline material, the CTAB may reduce silica content of the crystalline beta zeolite. Thus, the non-crystalline material may have reduced silica content relative to the crystalline beta zeolite.

CTAB may be included in a CTAB solution. The CTAB solution may have greater than or equal to 1 wt. %, greater than or equal to 2 wt. %, or greater than or equal to 3 wt. % of CTAB. The CTAB solution may have less than or equal to 10 wt. %, less than or equal to 8 wt. %, less than or equal to 7 wt. %, or less than or equal to 6 wt. % of CTAB. The CTAB solution may have from 1 wt. % to 10 wt. %, from 1 wt. % to 8 wt. %, from 1 wt. % to 7 wt. %, from 1 wt. % to 6 wt. %, from 2 wt. % to 10 wt. %, from 2 wt. % to 8 wt. %, from 2 wt. % to 7 wt. %, from 2 wt. % to 6 wt. %, from 3 wt. % to 10 wt. %, from 3 wt. % to 8 wt. %, from 3 wt. % to 7 wt. %, or from 3 wt. % to 6 wt. % of CTAB.

Still referring to FIGS. 1A and 1B, in step 111, the solution may be heated at a temperature of from 50° C. to 150° C. to convert the crystalline beta zeolite to a non-crystalline material with reduced silica content relative to the crystalline beta zeolite. In the heating step, the crystalline beta zeolite may be disintegrated. The term "disintegrated" may refer that the siloxane bonds (silicate groups) of the crystalline beta zeolite are broken.

The solution may be heated at a temperature of greater than or equal to 50° C., greater than or equal to 60° C., greater than or equal to 70° C., or greater than or equal to 80° C. The solution may be heated at a temperature of less than or equal to 150° C., less than or equal to 140° C., less than or equal to 130° C., or less than or equal to 120° C. The solution may be heated at a temperature of from 50° C. to 150° C., from 50° C. to 140° C., from 50° C. to 130° C., from 50° C. to 120° C., from 60° C. to 150° C., from 60° C. to 140° C., from 60° C. to 130° C., from 60° C. to 120° C., from 70° C. to 150° C., from 70° C. to 140° C., from 70° C. to 130° C., from 70° C. to 120° C., from 80° C. to 150° C., from 80° C. to 140° C., from 80° C. to 130° C., or from 80° C. to 120° C.

Still referring to FIGS. 1A and 1B, in step 111, the heated solution may be cooled to a temperature of from 25° C. to 40° C. The solution may be cooled at a temperature of greater than or equal to 0° C., greater than or equal to 10° C., greater than or equal to 20° C., or greater than or equal to 25° C. The solution may be cooled at a temperature of less than or equal to 50° C., less than or equal to 45° C., less than or equal to 40° C., or less than or equal to 30° C. The solution may be cooled at a temperature of from 0° C. to 50° C., from 0° C. to 45° C., from 0° C. to 40° C., from 0° C. to 30° C., from 10° C. to 50° C., from 10° C. to 45° C., from 10° C. to 40° C., from 10° C. to 30° C., from 20° C. to 50° C., from 20° C. to 45° C., from 20° C. to 40° C., from 20° C. to 30° C., from 25° C. to 50° C., from 25° C. to 45° C., or from 25° C. to 40° C.

Still referring to FIGS. 1A and 1B, step 110 of forming a mesoporous beta zeolite includes step 112 of crystalizing the non-crystalline material to produce mesoporous beta zeolite particles. In some embodiments, in step 112, the pH of the solution may be adjusted to from 8 to 10 by adding an acid. In the step of adjusting a pH of the solution, CTAB, which is already present in the solution, takes a circular micellar form.

The acid may include dilute sulfuric acid, nitric acid, acetic acid, citric acid, oxalic acid, or combinations thereof. In some embodiments, the acid may have from 0.1 Normality (N) to 5 N, from 0.1 N to 4 N, from 0.1 N to 3 N, from 0.5 N to 5 N, from 0.5 N to 4 N, from 0.5 N to 3 N, from 1 N to 5 N, from 1 N to 4 N, or from 1 N to 3 N.

In some embodiments, the solution may have the pH of greater than or equal to 13. The pH of the solution may be adjusted to greater than or equal to 7, greater than or equal to 8, or greater than or equal to 9. The pH of the solution may be adjusted to less than or equal to 12, less than or equal to 11, or less than or equal to 10. The pH of the solution may be adjusted to from 7 to 12, from 7 to 11, from 7 to 10, from 8 to 12, from 8 to 11, from 8 to 10, from 9 to 12, from 9 to 11, or from 9 to 10.

In some embodiments, the process of the present disclosure of producing a catalyst includes stirring the solution from 10 hour to 48 hours (not shown in FIGS. 1A and 1B). The solution may be stirred at a time period of greater than or equal to 10 hours, greater than or equal to 13 hours, greater than or equal to 17 hours, or greater than or equal to 20 hours. The solution may be stirred at a time period of less than or equal to 48 hours, less than or equal to 40 hours, less than or equal to 35 hours, or less than or equal to 30 hours. The solution may be stirred at a time period of from 10 hours to 48 hours, from 10 hours to 40 hours, from 10 hours to 35 hours, from 10 hours to 30 hours, from 13 hours to 48 hours, from 13 hours to 40 hours, from 13 hours to 35 hours, from 13 hours to 30 hours, from 17 hours to 48 hours, from 17 hours to 40 hours, from 17 hours to 35 hours, from 17 hours to 30 hours, from 20 hours to 48 hours, from 20 hours to 40 hours, from 20 hours to 35 hours, or from 20 hours to 30 hours.

Still referring to FIGS. 1A and 1B, in step 112, the solution is aged at a temperature of from 50° C. to 150° C. for a time period sufficient to crystalize the non-crystalline material to produce beta zeolite particles. When the non-crystalline material is crystalized, the silica broken from the crystalline beta zeolite helps to produce a mesoporous beta zeolite having uniform mesopores and micropores. In particular, a surfactant, CTAB, may act as a structure directing agent. Re-crystallisation of beta zeolite in the presence of CTAB may prevent the dissolution of the crystals and lead to almost complete recovery of the zeolite. After calcination, the surfactant moiety may be removed and the resulting voids constitute the mesopores of the mesoporous zeolite. The achievement of uniform mesoporosity is highly desirable because the mesopore quality, which encompasses size, distribution, and connectivity, helps improve stability against coke deactivation. Conventional microporous beta zeolite may inhibit access to catalytically active sites on the beta zeolite to larger molecules, which may have a molecular size equal to or greater than the average pore size of the microporous beta zeolite. The mesoporous beta zeolite produced by the presently described process may be hierarchical mesoporous beta zeolite having both uniform mesopores and micropores. With these uniform mesopores and micropores, the mesoporous beta zeolite may increase access to the large size molecules, and thereby suitable for hydrocarbon feedstocks including larger hydrocarbon molecules, such as crude oil. Also, the mesoporous beta zeolite may exhibit stability at elevated temperatures, such as temperatures greater than 500° C., and the acid sites of mesoporous beta zeolites may be compatible with hydrocracking reactions, which are helpful to break up a hydrocarbon feed or a hydrocarbon fraction into smaller molecules. The mesoporous beta zeolite, therefore, may facilitate the transport of the larger hydrocarbon molecules in crude oil to catalytic sites and reduce the diffusion limitations of these catalysts.

The solution may be aged at a temperature of greater than or equal to 50° C., greater than or equal to 60° C., greater than or equal to 70° C., or greater than or equal to 80° C. The solution may be aged at a temperature of less than or equal to 150° C., less than or equal to 140° C., less than or equal to 130° C., or less than or equal to 120° C. The solution may be aged at a temperature of from 50° C. to 150° C., from 50° C. to 140° C., from 50° C. to 130° C., from 50° C. to 120° C., from 60° C. to 150° C., from 60° C. to 140° C., from 60° C. to 130° C., from 60° C. to 120° C., from 70° C. to 150° C., from 70° C. to 140° C., from 70° C. to 130° C., from 70° C. to 120° C., from 80° C. to 150° C., from 80° C. to 140° C., from 80° C. to 130° C., or from 80° C. to 120° C. The solution may be aged at a time period of greater than or equal to 10 hours, greater than or equal to 13 hours, greater than or equal to 17 hours, or greater than or equal to 20 hours. The solution may be aged at a time period of less than or equal to 48 hours, less than or equal to 40 hours, less than or equal to 35 hours, or less than or equal to 30 hours. The solution may be aged at a time period of from 10 hours to 48 hours, from 10 hours to 40 hours, from 10 hours to 35 hours, from 10 hours to 30 hours, from 13 hours to 48 hours, from 13 hours to 40 hours, from 13 hours to 35 hours, from 13 hours to 30 hours, from 17 hours to 48 hours, from 17 hours to 40 hours, from 17 hours to 35 hours, from 17 hours to 30 hours, from 20 hours to 48 hours, from 20 hours to 40 hours, from 20 hours to 35 hours, or from 20 hours to 30 hours.

In some embodiments, the process of the present disclosure of producing the catalyst includes filtering the beta zeolite particles from the solution (not shown in FIGS. 1A and 1B).

In some embodiments, the process of the present disclosure of producing the catalyst includes washing the beta zeolite particles through distilled water (not shown in FIGS. 1A and 1B). The beta zeolite particles may be washed through distilled water to remove excess metal hydroxide and CTAB from the beta zeolite particles.

In some embodiments, the process of the present disclosure of producing the catalyst includes drying the beta zeolite particles at a temperature of from 50° C. to 150° C. (not shown in FIGS. 1A and 1B). The beta zeolite particles may be dried at a temperature of greater than or equal to 50° C., greater than or equal to 60° C., or greater than or equal to 70° C. The beta zeolite particles may be dried at a temperature of less than or equal to 200° C., less than or equal to 150° C., or less than or equal to 100° C. The beta zeolite particles may be dried at a temperature of from 50° C. to 200° C., from 50° C. to 150° C., from 50° C. to 100° C., from 60° C. to 200° C., from 60° C. to 150° C., from 60° C. to 100° C., from 70° C. to 200° C., from 70° C. to 150° C., or from 70° C. to 100° C. The solution may be dried at a time period of greater than or equal to 2 hours, greater than or equal to 4 hours, greater than or equal to 6 hours, or greater than or equal to 8 hours. The solution may be dried at a time period of less than or equal to 24 hours, less than or equal to 20 hours, less than or equal to 15 hours, or less than or equal to 12 hours. The solution may be dried at a time period of from 2 hours to 24 hours, from 2 hours to 20 hours, from 2 hours to 15 hours, from 2 hours to 12 hours, from 4 hours to 24 hours, from 4 hours to 20 hours, from 4 hours to 15 hours, from 4 hours to 12 hours, from 6 hours to 24 hours, from 6 hours to 20 hours, from 6 hours to 15 hours, from 6 hours to 12 hours, from 8 hours to 24 hours, from 8 hours to 20 hours, from 8 hours to 15 hours, or from 8 hours to 12 hours.

In some embodiments, the process of the present disclosure of producing the catalyst includes calcining the beta zeolite particles at a temperature of from 400° C. to 800° C. for 1 to 12 hours to remove the surfactant, such as CTAB (not shown in FIGS. 1A and 1B). The beta zeolite particles may be calcined at a temperature of greater than or equal to 400° C., greater than or equal to 450° C., or greater than or equal to 500° C. The beta zeolite particles may be calcined at a temperature of less than or equal to 800° C., less than or equal to 700° C., or less than or equal to 600° C. The beta zeolite particles may be calcined at a temperature of from 400° C. to 800° C., from 400° C. to 700° C., from 400° C. to 600° C., from 450° C. to 800° C., from 450° C. to 700° C., from 450° C. to 600° C., from 500° C. to 800° C., from 500° C. to 700° C., or from 500° C. to 600° C. The solution may be calcined at a time period of greater than or equal to 1 hour, greater than or equal to 3 hours, or greater than or equal to 5 hours. The solution may be calcined at a time period of less than or equal to 15 hours, less than or equal to 12 hours, less than or equal to 10 hours, or less than or equal to 8 hours. The solution may be calcined at a time period of from 1 hour to 15 hours, from 1 hour to 12 hours, from 1 hour to 10 hours, from 1 hour to 8 hours, from 3 hours to 15 hours, from 3 hours to 12 hours, from 3 hours to 10 hours, from 3 hours to 8 hours, from 5 hour to 15 hours, from 5 hour to 12 hours, from 5 hour to 10 hours, or from 5 hour to 8 hours.

Still referring to FIGS. 1A and 1B, in some embodiments, the process of the present disclosure of producing the catalyst includes treating the beta zeolite particles with ammonium salt a temperature of from 70° C. to 90° C. for 1 to 12 hours (not shown in FIGS. 1A and 1B). The treating the beta zeolite particles with the ammonium salt may cause sufficient ion exchange of sodium ions with ammonium ions present in the ammonium salt to produce the mesoporous beta zeolite. The beta zeolite particles may be treated with the ammonium salt at a temperature of greater than or equal to or equal to 40° C., greater than or equal to or equal to 50° C., or greater than or equal to or equal to 60° C. The beta zeolite particles may be treated with the ammonium salt at a temperature of less than or equal to 200° C., less than or equal to 150° C., or less than or equal to 100° C. The beta zeolite particles may be treated with the ammonium salt at a temperature of from 40° C. to 200° C., from 40° C. to 150° C., from 40° C. to 100° C., from 50° C. to 200° C., from 50° C. to 150° C., from 50° C. to 100° C., from 60° C. to 200° C., from 60° C. to 150° C., or from 60° C. to 100° C. The solution may be treated with the ammonium salt at a time period of greater than or equal to or equal to 1 hour, greater than or equal to or equal to 2 hours, or greater than or equal to or equal to 3 hours. The solution may be treated with the ammonium salt at a time period of less than or equal to 12 hours, less than or equal to 10 hours, less than or equal to 9 hours, or less than or equal to 8 hours. The solution may be treated with the ammonium salt at a time period of from 1 hour to 12 hours, from 1 hour to 10 hours, from 1 hour to 9 hours, from 1 hour to 8 hours, from 2 hours to 12 hours, from 2 hours to 10 hours, from 2 hours to 9 hours, from 2 hours to 8 hours, from 3 hour to 12 hours, from 3 hour to 10 hours, from 3 hour to 9 hours, or from 3 hour to 8 hours.

In some embodiments, the treating step may include first treating the beta zeolite particles with the ammonium salt at a temperature of from 70° C. to 90° C. for 1 to 12 hours, and second treating the beta zeolite particles with the ammonium salt at a temperature of from 70° C. to 90° C. for 1 to 12 hours to produce the mesoporous beta zeolite (not shown in FIGS. 1A and 1B). The beta zeolite particles may be first treated with the ammonium salt at a temperature of greater than or equal to 40° C., greater than or equal to 50° C., or greater than or equal to 60° C. The beta zeolite particles may be first treated with the ammonium salt at a temperature of less than or equal to 200° C., less than or equal to 150° C., or less than or equal to 100° C. The beta zeolite particles may be first treated with the ammonium salt at a temperature of from 40° C. to 200° C., from 40° C. to 150° C., from 40° C. to 100° C., from 50° C. to 200° C., from 50° C. to 150° C., from 50° C. to 100° C., from 60° C. to 200° C., from 60° C. to 150° C., or from 60° C. to 100° C. The solution may be first treated with the ammonium salt at a time period of greater than or equal to 1 hour, greater than or equal to 2 hours, or greater than or equal to 3 hours. The solution may be first treated with the ammonium salt at a time period of less than or equal to 12 hours, less than or equal to 10 hours, less than or equal to 9 hours, or less than or equal to 8 hours. The solution may be first treated with the ammonium salt at a time period of from 1 hour to 12 hours, from 1 hour to 10 hours, from 1 hour to 9 hours, from 1 hour to 8 hours, from 2 hours to 12 hours, from 2 hours to 10 hours, from 2 hours to 9 hours, from 2 hours to 8 hours, from 3 hour to 12 hours, from 3 hour to 10 hours, from 3 hour to 9 hours, or from 3 hour to 8 hours. The beta zeolite particles may be second treated with the ammonium salt at a temperature of greater than or equal to 40° C., greater than or equal to 50° C., or greater than or equal to 60° C. The beta zeolite particles may be second treated with the ammonium salt at a temperature of less than or equal to 200° C., less than or equal to 150° C., or less than or equal to 100° C. The beta zeolite particles may be second treated with the ammonium salt at a temperature of from 40° C. to 200° C., from 40° C. to 150° C., from 40° C. to 100° C., from 50° C. to 200° C., from 50° C. to 150° C., from 50° C. to 100° C., from 60° C. to 200° C., from 60° C. to 150° C., or from 60° C. to 100° C. The solution may be second treated with the ammonium salt at a time period of greater than or equal to 1 hour, greater than or equal to 2 hours, or greater than or equal to 3 hours. The solution may be second treated with the ammonium salt at a time period of less than or equal to 12 hours, less than or equal to 10 hours, less than or equal to 9 hours, or less than or equal to 8 hours. The solution may be second treated with the ammonium salt at a time period of from 1 hour to 12 hours, from 1 hour to 10 hours, from 1 hour to 9 hours, from 1 hour to 8 hours, from 2 hours to 12 hours, from 2 hours to 10 hours, from 2 hours to 9 hours, from 2 hours to 8 hours, from 3 hour to 12 hours, from 3 hour to 10 hours, from 3 hour to 9 hours, or from 3 hour to 8 hours.

The ammonium salt may include salts that include an ammonium cation and at least one anion, such as but not limited to nitrate, chloride, carbonate, sulfate, or combinations of these. In some embodiments, the ammonium salt may include ammonium nitrate, ammonium chloride, ammonium sulfate, ammonium carbonate, or combinations thereof.

The ammonium salt may be included in an ammonium salt solution. The ammonium salt solution may have a concentration of ammonium salts of from 0.05 moles per liter (M) to 0.5 M, such as from 0.05 M to 0.4 M, from 0.05 M to 0.3 M, from 0.1 M to 0.5 M, from 0.1 M to 0.4 M, from 0.1 M to 0.3 M, from 0.2 M to 0.5 M, from 0.2 M to 0.4 M, or from 0.2 M to 0.3 M.

In step 120, the mesoporous beta zeolite particles are produced. The mesoporous beta zeolite particles may have an average particle size of from 0.1 μm to 3.0 μm, from 0.1 μm to 2.0 μm, from 0.1 μm to 1.1 μm, 0.2 μm to 3.0 μm, from 0.2 μm to 2.0 μm, from 0.2 μm to 1.1 μm, 0.4 μm to 3.0 μm, from 0.4 μm to 2.0 μm, or from 0.4 μm to 1.1 μm. The particle size may be calculated from XRD.

The mesoporous beta zeolite produced according to the previously described processes may have both mesopores and micropores. In some embodiments, the average mesopore size of the mesoporous beta zeolite may be from 2 nm to 20 nm, from 2 nm to 15 nm, from 2 nm to 10 nm, from 2 nm to 5 nm, from 2 nm to 4.5 nm, from 3 nm to 20 nm, from 3 nm to 15 nm, from 3 nm to 10 nm, from 3 nm to 5 nm, or 3 nm to 4.5 nm. In some embodiments, the average micropore size of the mesoporous beta zeolite may be from 0.01 nm to 3 nm, from 0.01 nm to 2.5 nm, from 0.01 nm to 2.0 nm, from 0.05 nm to 3 nm, from 0.05 nm to 2.5 nm, from 0.05 nm to 2.0 nm, from 0.1 nm to 3 nm, from 0.1 nm to 2.5 nm, from 0.1 nm to 2.0 nm, from 0.5 nm to 3 nm, from 0.5 nm to 2.5 nm, or from 0.5 nm to 2.0 nm.

In some embodiments, the mesoporous beta zeolite may have a total pore volume of from 0.1 $cm^3/g$ to 1.0 $cm^3/g$, from 0.1 $cm^3/g$ to 0.85 $cm^3/g$, from 0.1 $cm^3/g$ to 0.8 $cm^3/g$, from 0.5 $cm^3/g$ to 1.0 $cm^3/g$, from 0.5 $cm^3/g$ to 0.85 $cm^3/g$, or from 0.5 $cm^3/g$ to 0.8 $cm^3/g$ as determined by Brunauer-Emmett-Teller (BET) analysis. The total pore volume of the mesoporous beta zeolite may represent the total sum of the volume of micropores and mesopores in the mesoporous beta zeolite.

The mesoporous beta zeolite may have a Brunauer-Emmett-Teller (BET) surface area of from 400 square meters per gram ($m^2/g$) to 800 $m^2/g$, from 400 $m^2/g$ to 750 $m^2/g$, from 400 $m^2/g$ to 700 $m^2/g$, from 450 $m^2/g$ to 800 $m^2/g$, from 450 $m^2/g$ to 750 $m^2/g$, from 450 $m^2/g$ to 700 $m^2/g$, from 500 $m^2/g$ to 800 $m^2/g$, from 500 $m^2/g$ to 750 $m^2/g$, or from 500 $m^2/g$ to 700 $m^2/g$.

The mesoporous beta zeolite may have a mesopore volume of from 300 $cm^3/g$ to 500 $cm^3/g$, from 300 $cm^3/g$ to 450 $cm^3/g$, from 300 $cm^3/g$ to 400 $cm^3/g$, from 350 $cm^3/g$ to 500 $cm^3/g$, from 350 $cm^3/g$ to 450 $cm^3/g$, or from 350 $cm^3/g$ to 400 $cm^3/g$.

Still referring to FIGS. 1A and 1B, in step 120, the mesoporous beta zeolite particles are impregnated with a metal and phosphorus to produce a metal and phosphorus impregnated zeolite. For the impregnation method, the mesoporous beta zeolite particles may be mixed with water to form a dough that can be extruded using an extruder. The extrudate may be impregnated with an aqueous solution including the metal and phosphorus.

In some embodiments, the metal includes Ce, La, Fe, or combinations thereof. In some embodiments, the metal and phosphorus impregnated zeolite include the metal in amount of from 0.1 wt. % to 10 wt. %, from 0.1 wt. % to 8 wt. %, from 0.1 wt. % to 5 wt. %, from 0.5 wt. % to 10 wt. %, from 0.5 wt. % to 8 wt. %, from 0.5 wt. % to 5 wt. %, from 1 wt. % to 10 wt. %, from 1 wt. % to 8 wt. %, from 1 wt. % to 5 wt. % the total weight of the metal and phosphorus impregnated zeolite, or any combination of these ranges.

In some embodiments, the metal and phosphorus impregnated zeolite includes Ce, La, and Fe. In some embodiments, the metal and phosphorus impregnated zeolite includes from 0.1 wt. % to 5 wt. %, from 0.1 wt. % to 3 wt. %, from 0.1 wt. % to 2 wt. %, from 0.5 wt. % to 5 wt. %, from 0.5 wt. % to 3 wt. %, or from 0.5 wt. % to 2 wt. % of Ce based on the total weight of the metal and phosphorus impregnated zeolite, from 0.1 wt. % to 5 wt. %, from 0.1 wt. % to 3 wt. %, from 0.1 wt. % to 2 wt. %, from 0.5 wt. % to 5 wt. %, from 0.5 wt. % to 3 wt. %, or from 0.5 wt. % to 2 wt. % of La based on the total weight of the metal and phosphorus impregnated zeolite, from 0.1 wt. % to 5 wt. %, from 0.1 wt. % to 3 wt. %, from 0.1 wt. % to 2 wt. %, from 0.5 wt. % to 5 wt. %, from 0.5 wt. % to 3 wt. %, or from 0.5 wt. % to 2 wt. % of Fe based on the total weight of the metal and phosphorus impregnated zeolite.

In some embodiments, the metal and phosphorus impregnated zeolite includes phosphorus. In some embodiments, the metal and phosphorus impregnated zeolite includes $P_2O_5$. In some embodiments, the metal and phosphorus impregnated zeolite include $P_2O_5$ in amount of from 1 wt. % to 10 wt. %, from 1 wt. % to 8 wt. %, from 1 wt. % to 5 wt. %, from 2 wt. % to 10 wt. %, from 2 wt. % to 8 wt. %, from 2 wt. % to 5 wt. %, from 3 wt. % to 10 wt. %, from 3 wt. % to 8 wt. %, from 3 wt. % to 5 wt. % the total weight of the metal and phosphorus impregnated zeolite, or any combination of these ranges.

In some embodiments, the metal and phosphorus impregnated zeolite include 0.1 wt. % to 5 wt. % of Ce based on the total weight of the metal and phosphorus impregnated zeolite, 0.1 wt. % to 5 wt. % of La based on the total weight of the metal and phosphorus impregnated zeolite, 0.1 wt. % to 5 wt. % of Fe based on the total weight of the metal and phosphorus impregnated zeolite, and 2 wt. % to 10 wt. % of $P_2O_5$ based on the total weight of the metal and phosphorus impregnated zeolite.

Still referring to FIGS. 1A and 1B, in step 130, the metal and phosphorus impregnated zeolite is incorporated with clay and alumina to produce the catalyst.

In some embodiments, the catalyst may include the metal and phosphorus impregnated zeolite in an amount of from 25 wt. % to 60 wt. % of the total weight of the catalyst. For example, the catalyst may include the metal and phosphorus impregnated zeolite in an amount of from 25 wt. % to 55 wt. %, from 25 wt. % to 50 wt. %, from 30 wt. % to 60 wt. %, from 30 wt. % to 55 wt. %, from 30 wt. % to 50 wt. %, from 35 wt. % to 60 wt. %, from 35 wt. % to 55 wt. %, from 35 wt. % to 50 wt. % the total weight of the catalyst, or any combination of these ranges.

The clay may act as matrix materials. Without being bound by theory, it is believed that the matrix materials of the catalyst serve both physical and catalytic functions. Physical functions include providing particle integrity and attrition resistance, acting as a heat transfer medium, and providing a porous structure to allow diffusion of hydrocarbons into and out of the catalyst microspheres. The matrix materials can also affect catalyst selectivity, product quality and resistance to poisons. The matrix materials may tend to exert its strongest influence on overall catalytic properties for those reactions which directly involve relatively large molecules.

In some embodiments, the clay may include kaolin clay. As used in this disclosure, the term "kaolin" may refer to a clay material that has a relatively large amount (such as at least about 50 wt. %, at least 60 wt. %, at least 70 wt. %, at least 80 wt. %, at least 90 wt. %, or even at least 95 wt. %) of kaolinite, which can be represented by the chemical formula $Al_2Si_2O_5(OH)_4$.

In some embodiments, the catalyst may include the clay in an amount of from 25 wt. % to 60 wt. % of the total weight of the catalyst. For example, the catalyst may include the clay in an amount of from 25 wt. % to 55 wt. %, from 25 wt. % to 50 wt. %, from 30 wt. % to 60 wt. %, from 30 wt. % to 55 wt. %, from 30 wt. % to 50 wt. %, from 35 wt. % to 60 wt. %, from 35 wt. % to 55 wt. %, from 35 wt. % to 50 wt. % the total weight of the catalyst, or any combination of these ranges.

The alumina may act as a binder. As used in this disclosure, the term "binder" may refer to materials which may serve to "glue" or otherwise hold zeolite and the matrix together in the microsphere. It may improve the attrition resistance of the catalyst.

In some embodiments, the catalyst may include alumina in an amount of from 10 wt. % to 40 wt. % of the total weight of the catalyst. For example, the catalyst may include alumina in an amount of from 10 wt. % to 35 wt. %, from 10 wt. % to 30 wt. %, from 12 wt. % to 40 wt. %, from 12 wt. % to 35 wt. %, from 12 wt. % to 30 wt. %, from 15 wt. % to 40 wt. %, from 15 wt. % to 35 wt. %, from 15 wt. % to 30 wt. % the total weight of the catalyst, or any combination of these ranges.

The catalyst may be formed by a variety of processes. In some embodiments, the clay may be mixed with a fluid such as water to form a slurry, and the mesoporous beta zeolites may be separately mixed with a fluid such as water to form a slurry. The clay slurry and the mesoporous beta zeolite slurry may be combined under stirring. Separately, another slurry may be formed by combining the alumina with a fluid such as water. The alumina slurry may then be combined with the slurry containing the mesoporous beta zeolites and clay to form an all-ingredients slurry. The all-ingredients slurry may be dried, for example by spraying, and then calcined, to produce the catalyst.

In step 130, the catalysts are produced. The catalysts may include mesopores, micropores, and macropores. The mesoporous beta zeolite in the catalyst may provide mesopores and micropores. As described above, the mesoporous beta zeolite has uniform mesopores and micropores compared to conventional zeolites. With these uniform mesopores and micropores, the mesoporous beta zeolite may have longer catalytic cracking activity and increase access to the large size molecules, and thereby suitable for hydrocarbon feedstocks including larger hydrocarbon molecules, such as crude oil. Also, the mesoporous beta zeolite may exhibit improved hydrothermal stability at elevated temperatures, such as temperatures greater than 500° C., and the acid sites of mesoporous beta zeolites may be compatible with hydrocracking reactions, which are helpful to break up a hydrocarbon feed or a hydrocarbon fraction into smaller molecules. The mesoporous beta zeolite, therefore, may facilitate the transport of the larger hydrocarbon molecules in crude oil to catalytic sites and reduce the diffusion limitations of these catalysts. Moreover, alumina and the clay included in the catalyst may provide macropores in the catalyst. The macropores in the catalyst may break down large molecules in crude oil to make it easier for them to diffuse into the mesopores and micropores of the mesoporous beta zeolites. Further these macropores in the catalyst may trap contaminant metals. With these mesopores, micropores, and macropores, the catalyst produced by the presently described process may be capable of increasing the light olefin yield from steam enhanced fluidized catalytic cracking of the crude oil while having excellent hydrothermal stability and longer catalytic cracking activity.

The catalysts produced by previously described processes may be used as a catalyst in fluidized catalytic cracking (FCC) processes. The catalysts may be contacted with the crude oil in the presence of steam to produce light olefin in a reactor, such as fluidized catalytic cracking (FCC) reactor. As used in this disclosure, a "fluidized catalytic cracking (FCC) reactor" refers to a reactor that can be operable to contact a fluidized reactant with a solid material (usually in particulate form), such as a catalyst. The reactor may be a fluidized bed reactor. As described in this disclosure, a fluidized bed reactor which cracks a reactant stream with a fluidized solid catalyst may be referred to as a fluidized catalytic FCC reactor. Examples of suitable processes for catalytically cracking crude oil in the presence of steam are disclosed in U.S. patent application Ser. Nos. 17/009,008, 17/009,012, 17/009,020, 17/009,022, 17/009,039, 17/009,048, and 17/009,073, all of which are incorporated by reference in their entireties.

The catalyst may be deactivated by contact with steam prior to use in a reactor to convert crude oil. The purpose of steam treatment is to accelerate the hydrothermal aging which occurs in an operational FCC regenerator to obtain an equilibrium catalyst. Steam treatment may lead to the removal of aluminum from the framework leading to a decrease in the number of sites where framework hydrolysis can occur under hydrothermal and thermal conditions. This removal of aluminum results in an increased thermal and hydrothermal stability in dealuminated mesoporous beta zeolites. The unit cell size may decrease as a result of dealumination since the smaller $SiO_4$ tetrahedron replaces the larger $AlO_4$-tetrahedron. The acidity of mesoporous beta zeolite s may also be affected by dealumination through the removal of framework aluminum and the formation of extra-framework aluminum species. Dealumination may affect the acidity of the mesoporous beta zeolite by decreasing the total acidity and increasing the acid strength of the mesoporous beta zeolite. The total acidity may decrease because of the removal of framework aluminum, which act as Bronsted acid sites. The acid strength of the mesoporous beta zeolite may be increased because of the removal of paired acid sites or the removal of the second coordinate next nearest neighbor aluminum. The increase in the acid strength may be caused by the charge density on the proton of the OH group being highest when there is no framework aluminum in the second coordination sphere.

In some embodiments, the crude oil may have a relatively great API gravity, such as at least 30 degrees, and often greater than 50 degrees. In some embodiments, the crude oil may have an API gravity of at least about 30 degrees, at least 35 degrees, at least 40 degrees, at least 45 degrees, at least 50 degrees, at least 55 degrees, or even at least 60 degrees.

In some embodiments, the crude oil may have a boiling point profile as described by the 5 wt. % boiling temperature, the 25 wt. % boiling temperature, the 50 wt. % boiling temperature, the 75 wt. % boiling temperature, and the 95 wt. % boiling temperature. These respective boiling temperatures correspond to the temperature at which a given weight percentage of the hydrocarbon feed stream boils. In some embodiments, the crude oil may have one or more of a 5 wt. % boiling temperature of less than 150° C., a 25 wt. % boiling temperature of less than 225° C., a 50 wt. % boiling temperature of less than 300° C., a 75 wt. % boiling temperature of less than 400° C., and a 95 wt. % boiling temperature of less than 600° C. In some embodiments, the crude oil may have one or more of a 5 wt. % boiling temperature of from 0° C. to 100° C., a 25 wt. % boiling temperature of from 75° C. to 175° C., a 50 wt. % boiling temperature of from 150° C. to 250° C., a 75 wt. % boiling temperature of from 250° C. to 350° C., and a 95 wt. % boiling temperature of from 450° C. to 550° C.

In some embodiments, the reactor may be operated at a temperature of at least about 500° C. In some embodiments, the reactor may be operated at a temperature of from 500° C. to 800° C., from 550° C. to 800° C., from 600° C. to 800° C., from 650° C. to 800° C., from 500° C. to 750° C., from 550° C. to 750° C., from 600° C. to 750° C., from 650° C. to 750° C., from 500° C. to 700° C., from 550° C. to 700° C., from 600° C. to 700° C., or from 650° C. to 700° C.

In some embodiments, steam may be injected to the reactor. The crude oil may be catalytically cracked in the presence of the steam with the catalyst. Steam may act as a diluent to reduce a partial pressure of the hydrocarbons in the crude oil. The steam to the crude oil mass ratio may be from 0.2 to 1.0, from 0.3 to 1.0, from 0.4 to 1.0, from 0.5 to 1.0, from 0.2 to 0.8, from 0.3 to 0.8, from 0.4 to 0.8, from 0.5 to 0.8, from 0.2 to 0.7, from 0.3 to 0.7, from 0.4 to 0.7, from 0.5 to 0.7, from 0.2 to 0.6, from 0.3 to 0.6, from 0.4 to 0.6, or from 0.5 to 0.6. Steam may refer to all $H_2O$ in the steam.

In some embodiments, the residence time of the crude oil and the steam may be from 1 second to 20 seconds, from 2 seconds to 20 seconds, from 5 seconds to 20 seconds, from 8 seconds to 20 seconds, from 1 second to 18 seconds, from 2 seconds to 18 seconds, from 5 seconds to 18 seconds, from 8 seconds to 18 seconds, from 1 second to 16 seconds, from 2 seconds to 16 seconds, from 5 seconds to 16 seconds, from 8 seconds to 16 seconds, from 1 second to 14 seconds, from 2 seconds to 14 seconds, from 5 seconds to 14 seconds, from 8 seconds to 14 seconds, from 1 second to 12 seconds, from 2 seconds to 12 seconds, from 5 seconds to 12 seconds, or from 8 seconds to 12 seconds.

In some embodiments, the catalyst to crude oil weight ratio may be from 7 to 50, from 7.5 to 50, from 8 to 50, from 7 to 45, from 7.5 to 45, from 8 to 45, from 7 to 40, from 7.5 to 40, or from 8 to 40.

In some embodiments, the contacting of the crude oil with the catalyst in the presence of the steam produces a product stream that may comprise at least 30 wt. % of light olefins selected from ethylene, propylene, and butene. For example, in embodiments, the product stream may comprise at least 35 wt. % of light olefins, at least 38 wt. % of light olefins, or at least 40 wt. % of light olefins. In some embodiments, the product stream may comprise at least 12 wt. % of ethylene, at least 15 wt. % of ethylene, at least 18 wt. % of ethylene, or even at least 20 wt. % of ethylene, at least 12 wt. % of propylene, at least 14 wt. % of propylene, or even at least 15 wt. % of propylene, at least 4 wt. % of butene, at least 5 wt. % of butene, or even at least 6 wt. % of butene.

EXAMPLES

The various embodiments of methods for producing hierarchical mesoporous beta zeolites will be further clarified by the following examples. The examples are illustrative in nature, and should not be understood to limit the subject matter of the present disclosure.

Example 1: Produce Catalyst

In a glass reactor, 7 grams of a crystalline beta zeolite (HSZ-940 NHA) having the molar ratio of silicon to aluminum of 40 was mixed with 0.40 M sodium hydroxide (NaOH) solution. 4.45 wt. % of cetyltrimethylammonium bromide (CTAB) was also mixed with the crystalline beta zeolite and NaOH solution to produce a solution. The solution was heated with stirring at 100° C. for 24 hours to convert the crystalline beta zeolite to a non-crystalline material with reduced silica content. The heated solution was cooled down to a temperature of from 25° C. to 40° C. A pH of the cooled solution was adjusted to 9.0 through the addition of dilute sulfuric acid (2N). The solution was stirred for 24 hours and then aged at 100° C. for 24 hour to crystalize the non-crystalline material to produce beta zeolite particles. The beta zeolite particles were filtered, washed thoroughly using distilled water, and then dried at 80° C. overnight. The dried beta zeolite particles were calcined at 570° C. for 6 hours to remove CTAB. The calcined beta zeolite particle s were treated with 0.25 N ammonium nitrate ($NH_4NO_3$) solution twice at 80° C. for 5 hours to produce mesoporous beta zeolite.

Mesoporous beta zeolite was first impregnated with phosphorus and metals with a targeted phosphorus content of 3.5 wt. % $P_2O_5$ while the metal content (Ce, La and Fe) were 1 wt. % each of the total zeolite weight. The metal and phosphorus impregnated zeolite was then used to formulate a catalyst by spray drying. The formulated catalyst was prepared by blending 200 g (dry basis) kaolin clay powder with 431.92 g of deionized water (DI water) to make a kaolin slurry. In a separate step, 200 g (dry basis) of metal and phosphorus impregnated mesoporous beta zeolite was made into a slurry with 462.59 g of DI water and stirred for 10 mins. The zeolite slurry was added to the kaolin slurry and stirred for 5 mins. Separately, a slurry of Catapal B alumina was prepared by mixing 100.0 g (dry basis) kaolin clay powder with 194.92 g distilled water and peptized by adding 7.22 g concentrated formic acid (70 wt. %) and stirring for 30 mins. The resulting peptized Catapal B slurry was added to the zeolite-kaolin slurry and blended for 10 mins producing a slurry with high viscosity where the individual particles remain suspended. The resulting slurry made up of 30 wt. % solids was spray dried to produce particles of 20-100 microns, followed by calcination at 550° C. for 6 hours to produce the catalyst. The obtained catalyst was steam deactivated and tested in a fixed bed reactor for catalytic cracking.

Comparative Example 1

A mixture including 75 wt. % of Equilibrium Catalyst (ECAT) and 25 wt. % of ZSM-5 (commercially available as OlefinsUltra® from W.R. Grace and Company) (referred to as "UMIX75") was prepared.

Example 2: Steam Enhanced Fluidized Catalytic Cracking Testing

Example 2 provides data related to the cracking of crude oil in the presence of steam with Example 1 and Comparative Example 1. Experiments were carried out at atmospheric pressure in a fixed-bed reaction (FBR) system in the presence of steam and the absence of steam with Arabian Extra Light (AXL) crude oil as feed. Referring to FIG. 3, AXL crude oil 301 was fed to a fixed-bed reactor 30 using a metering pump 311. A constant feed rate of 2 g/h of AXL crude oil 301 was used. Water 302 was fed to the reactor 30 using a metering pump 312. Water 302 was preheated using a preheater 321. A constant feed rate of 1 g/h of water 302 was used. Nitrogen 303 was used as a carrier gas at 65 mL/min. Nitrogen 303 was fed to the reactor 30 using a Mass Flow Controller (MFC) 313. Nitrogen 303 was preheated using a preheater 322. Water 302 and Nitrogen 303 were mixed using a mixer 330 and the mixture was introduced to the reactor 30. Prior to entering the reactor tube, oil, water, and nitrogen were preheated up to 250° C. in the pre-heating zone 342. The pre-heating zone 342 was preheated using line heaters 331. Crude oil 301 was introduced from the top of the reactor 30 through the injector 341 and mixed with steam in the top two-third of the reactor tube 340 before reaching the catalyst bed 344. The mass ratio of steam:crude oil was 0.5. The crude oil was cracked at a cracking temperature of 675° C. and a weight ratio of catalyst to oil of 1:2. The residence time of the crude oil and the steam in the reactor was 10 seconds. Each of Example 1 and Comparative Example 1 was used as a cracking catalyst. 1 g of cracking catalyst of 30-40 mesh size was placed at the center of the reactor tube 340, supported by quartz wool 343, 346 and a reactor insert 345. Quartz wool 343, 346 were placed both at the bottom and top of the catalyst bed 344 to keep it in position. The height of the catalyst bed 344 was 1-2 cm. The reaction was allowed to take place for 45-60 min, until steady state was reached. Reaction conditions of the fixed-bed flow reactor 30 are listed in Table 1. The cracking reaction product stream was introduced to a gas-liquid separator 351. A Wet Test Meter 352 was placed downstream of the gas-liquid separator 351.

The cracked gaseous products 361 and liquid products 362 were characterized by off-line gas chromatographic (GC) analysis using simulated distillation and naphtha analysis techniques. The reaction product streams from the cracking reaction were analyzed for yields of ethylene, propylene, and butylene. The yield analyses for Example 2 are depicted in FIG. 3.

TABLE 1

| Conditions | |
|---|---|
| Feed Used | AXL Whole Crude |
| Specific gravity of feedstock | 0.829 |
| API | 39.3 |
| Reaction apparatus | Fixed Bed Reactor |
| Weight hourly space velocity | 3 |
| Reaction temperature, ° C. | 675 |
| Reaction temperature Range, ° C. | 600-700 |

As shown in FIG. 3, the yield of ethylene of Example 1 (20.7 wt. %) was greater than those of Comparative Example 1 (16.3 wt. %). Further, the yield of ethylene and propylene of Example 1 (37.0 wt. %) was greater than those of Comparative Example 1 (33.3 wt. %). These results show that the catalyst in Example 1 is much more selective towards ethylene, and ethylene and propylene compared to Comparative Example 1. Also, the catalyst in Example 1 showed abilities to withstand high hydrothermal conditions, while retaining its activity and selectivity.

In addition, the yield of light olefin of Example 1 (43.3 wt. %) was greater than those of Comparative Example 1 (43.2 wt. %).

A first aspect of the present disclosure may be directed to a process of producing a catalyst comprising forming mesoporous beta zeolite particles, the forming step comprising converting a crystalline beta zeolite to a non-crystalline material with reduced silica content relative to the crystalline beta zeolite, and crystalizing the non-crystalline material to produce mesoporous beta zeolite particles, impregnating the mesoporous beta zeolite particles with a metal and phosphorus to produce a metal and phosphorus impregnated zeolite, and incorporating the metal and phosphorus impregnated zeolite with clay and alumina to produce the catalyst.

A second aspect of the present disclosure may include the first aspect, wherein the metal comprises Ce, La, Fe, or combinations thereof.

A third aspect of the present disclosure may include either one of the first or second aspects, wherein the metal and phosphorus impregnated zeolite comprises 0.1 wt. % to 5 wt. % of Ce based on the total weight of the metal and phosphorus impregnated zeolite, 0.1 wt. % to 5 wt. % of La based on the total weight of the metal and phosphorus impregnated zeolite, 0.1 wt. % to 5 wt. % of Fe based on the total weight of the metal and phosphorus impregnated zeolite, and 2 wt. % to 10 wt. % of $P_2O_5$ based on the total weight of the metal and phosphorus impregnated zeolite.

A fourth aspect of the present disclosure may include any one of the first through third aspects, wherein the clay comprises kaolin clay.

A fifth aspect of the present disclosure may include any one of the first through fourth aspects, wherein the metal and phosphorus impregnated zeolite to the clay mass ratio is from 0.5 to 2.

A sixth aspect of the present disclosure may include any one of the first through fifth aspects, wherein the converting step comprises mixing a crystalline beta zeolite with one or more solvents, cetyltrimethylammonium bromide (CTAB), and metal hydroxide to form a solution, and heating the solution at a temperature of from 50° C. to 150° C. to convert the crystalline beta zeolite to the non-crystalline material with reduced silica content relative to the crystalline beta zeolite.

A seventh aspect of the present disclosure may include any one of the first through sixth aspects, wherein the forming step further comprises cooling the solution to a temperature of from −25° C. to 50° C.

An eighth aspect of the present disclosure may include any one of the first through seventh aspects, wherein the crystalizing step comprises adjusting a pH of the solution to from 8 to 10 by adding an acid, and aging the solution at a temperature of from 50° C. to 150° C. for a time period sufficient to crystalize the non-crystalline material to produce the beta zeolite particles.

A ninth aspect of the present disclosure may include any one of the first through eighth aspects, wherein the forming step further comprises treating the beta zeolite particles with ammonium salt a temperature of from 70° C. to 90° C. for 1 to 12 hours.

A tenth aspect of the present disclosure may include any one of the first through ninth aspects, wherein the crystalline beta zeolite comprises an average crystal size of from 0.1 micrometer (µm) to 1.4 µm.

An eleventh aspect of the present disclosure may include any one of the first through tenth aspects, wherein the crystalline beta zeolite comprises a molar ratio of silica to alumina of from 30 to 350.

A twelfth aspect of the present disclosure may include any one of the first through eleventh aspects, wherein the metal hydroxide is in a solution and comprises a concentration from 0.01 moles per liter (M) to 5 M.

A thirteenth aspect of the present disclosure may include any one of the first through twelfth aspects, wherein the metal hydroxide comprises lithium hydroxide (LiOH), sodium hydroxide (NaOH), potassium hydroxide (KOH), rubidium hydroxide (RbOH), magnesium hydroxide (Mg(OH)$_2$), calcium hydroxide (Ca(OH)$_2$), strontium hydroxide (Sr(OH)$_2$), barium hydroxide (Ba(OH)$_2$), or combinations thereof.

A fourteenth aspect of the present disclosure may include any one of the first through thirteenth aspects, wherein the mesoporous beta zeolite comprises an average particle size of from 0.4 µm to 1.1 µm.

A fifteenth aspect of the present disclosure may include any one of the first through fourteenth aspects, wherein the mesoporous beta zeolite comprises a total pore volume of from 0.5 cubic centimeters per gram (cm$^3$/g) to 0.8 cm$^3$/g.

A sixteenth aspect of the present disclosure may include any one of the first through fifteenth aspects, wherein the mesoporous beta zeolite comprises a Brunauer-Emmett-Teller (BET) surface area of 450 square meters per gram (m$^2$/g) to 700 m$^2$/g.

A seventeenth aspect of the present disclosure may include any one of the first through sixteenth aspects, wherein the mesoporous beta zeolite comprises an average mesopore size of from 2 nm to 5 nm and an average micropore size of from 0.5 nm to 2.0 nm.

An eighteenth aspect of the present disclosure may be directed to a process of cracking crude oil comprising contacting the crude oil with a catalyst in a fluidized bed reactor, wherein the catalyst is produced by the process of any one of the first through seventeenth aspects.

A nineteenth aspect of the present disclosure may include any one of the first through eighteenth aspects, further comprising injecting steam in to the reactor, wherein the steam to the crude oil mass ratio of from 0.2 to 1.0.

A twentieth aspect of the present disclosure may include any one of the first through nineteenth aspects, wherein the catalyst to the crude oil weight ratio is from 7 to 40.

It is noted that one or more of the following claims utilize the term "wherein" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A process of producing a catalyst, the process comprising:

forming mesoporous beta zeolite particles, the forming step comprising:
   converting a crystalline beta zeolite to a non-crystalline material with reduced silica content relative to the crystalline beta zeolite; and
   crystalizing the non-crystalline material to produce mesoporous beta zeolite particles;
   impregnating the mesoporous beta zeolite particles with a metal and phosphorus to produce a metal and phosphorus impregnated zeolite; and
   incorporating the metal and phosphorus impregnated zeolite with clay and alumina to produce the catalyst.

2. The process of claim 1, wherein the metal comprises Ce, La, Fe, or combinations thereof.

3. The process of claim 1, wherein the metal and phosphorus impregnated zeolite comprises:
   0.1 wt. % to 5 wt. % of Ce based on the total weight of the metal and phosphorus impregnated zeolite;
   0.1 wt. % to 5 wt. % of La based on the total weight of the metal and phosphorus impregnated zeolite;
   0.1 wt. % to 5 wt. % of Fe based on the total weight of the metal and phosphorus impregnated zeolite; and
   2 wt. % to 10 wt. % of $P_2O_5$ based on the total weight of the metal and phosphorus impregnated zeolite.

4. The process of claim 1, wherein the clay comprises kaolin clay.

5. The process of claim 1, wherein the metal and phosphorus impregnated zeolite to the clay mass ratio is from 0.5 to 2.

6. The process of claim 1, wherein the converting step comprises:
   mixing a crystalline beta zeolite with one or more solvents, cetyltrimethylammonium bromide (CTAB), and metal hydroxide to form a solution; and
   heating the solution at a temperature of from 50° C. to 150° C. to convert the crystalline beta zeolite to the non-crystalline material with reduced silica content relative to the crystalline beta zeolite.

7. The process of claim 6, wherein the forming step further comprises cooling the solution to a temperature of from −25° C. to 50° C.

8. The process of claim 6, wherein the crystalizing step comprises:
   adjusting a pH of the solution to from 8 to 10 by adding an acid; and
   aging the solution at a temperature of from 50° C. to 150° C. for a time period sufficient to crystalize the non-crystalline material to produce the beta zeolite particles.

9. The process of claim 1, wherein the forming step further comprises treating the beta zeolite particles with ammonium salt a temperature of from 70° C. to 90° C. for 1 to 12 hours.

10. The process of claim 1, wherein the crystalline beta zeolite comprises an average crystal size of from 0.1 micrometer (μm) to 1.4 μm.

11. The process of claim 1, wherein the crystalline beta zeolite comprises a molar ratio of silica to alumina of from 30 to 350.

12. The process of claim 6, wherein the metal hydroxide is in a solution and comprises a concentration from 0.01 moles per liter (M) to 5 M.

13. The process of claim 6, wherein the metal hydroxide comprises lithium hydroxide (LiOH), sodium hydroxide (NaOH), potassium hydroxide (KOH), rubidium hydroxide (RbOH), magnesium hydroxide ($Mg(OH)_2$), calcium hydroxide (Ca(OH)$_2$), strontium hydroxide (Sr(OH)$_2$), barium hydroxide (Ba(OH)$_2$), or combinations thereof.

14. The process of claim 1, wherein the mesoporous beta zeolite comprises an average particle size of from 0.4 μm to 1.1 μm.

15. The process of claim 1, wherein the mesoporous beta zeolite comprises a total pore volume of from 0.5 cubic centimeters per gram (cm$^3$/g) to 0.8 cm$^3$/g.

16. The process of claim 1, wherein the mesoporous beta zeolite comprises a Brunauer-Emmett-Teller (BET) surface area of 450 square meters per gram (m$^2$/g) to 700 m$^2$/g.

17. The process of claim 1, wherein the mesoporous beta zeolite comprises an average mesopore size of from 2 nm to 5 nm and an average micropore size of from 0.5 nm to 2.0 nm.

\* \* \* \* \*